US009736782B2

(12) United States Patent
Nilsson

(10) Patent No.: US 9,736,782 B2
(45) Date of Patent: Aug. 15, 2017

(54) MOBILE DEVICE ENVIRONMENT DETECTION USING AN AUDIO SENSOR AND A REFERENCE SIGNAL

(71) Applicant: Sony Mobile Communications Inc., Tokyo (JP)

(72) Inventor: Jan Nilsson, Lund (SE)

(73) Assignees: Sony Corporation, Tokyo (JP); Sony Mobile Communications Inc., Tokyo (JP)

( * ) Notice: Subject to any disclaimer, the term of this patent is extended or adjusted under 35 U.S.C. 154(b) by 0 days.

(21) Appl. No.: 14/708,376

(22) Filed: May 11, 2015

(65) Prior Publication Data

US 2016/0302155 A1 Oct. 13, 2016

Related U.S. Application Data

(63) Continuation-in-part of application No. 14/684,769, filed on Apr. 13, 2015, now abandoned.

(51) Int. Cl.
*H04W 52/02* (2009.01)
*H04W 68/00* (2009.01)
*H04M 1/725* (2006.01)

(52) U.S. Cl.
CPC ... *H04W 52/0254* (2013.01); *H04M 1/72569* (2013.01); *H04W 68/005* (2013.01); *H04M 2250/12* (2013.01); *Y02B 60/50* (2013.01)

(58) Field of Classification Search
CPC ............ H04W 52/0254; H04W 68/005; G01S 7/52041; G01S 7/52042; G01S 15/88
USPC .......... 455/567, 574; 73/587, 599, 645, 646; 367/95
See application file for complete search history.

(56) References Cited

U.S. PATENT DOCUMENTS

| | | | |
|---|---|---|---|
| 6,246,761 B1 * | 6/2001 | Cuddy ..................... | G08B 3/10 379/372 |
| 6,542,436 B1 * | 4/2003 | Myllyla .................. | G01S 7/527 340/686.6 |
| 9,288,594 B1 * | 3/2016 | Polansky ................ | G10L 19/00 |
| 2010/0080084 A1 * | 4/2010 | Chen ....................... | G01S 11/14 367/118 |
| 2010/0146445 A1 | 6/2010 | Kraut | |

(Continued)

FOREIGN PATENT DOCUMENTS

| EP | 2 779 689 A1 | 9/2014 |
|---|---|---|
| GB | 2 445 436 A | 7/2008 |
| WO | 2012 123787 A1 | 9/2012 |

OTHER PUBLICATIONS

International Search Report and Written Opinion for corresponding PCT application No. PCT/IB2015/057806, issued Jan. 11, 2016.

*Primary Examiner* — King Poon
*Assistant Examiner* — Vincent Peren
(74) *Attorney, Agent, or Firm* — Renner, Otto, Boisselle & Sklar, LLP

(57) ABSTRACT

A mobile device configured to modify the mobile device's behavior based on the local environment of the mobile device. The mobile device determines the local environment based on a comparison of sound detected by the mobile device's audio sensor to sound detected by an exterior audio sensor. In particular, the mobile device determines if it is covered and, if covered, the mobile device determines properties of the covering material.

14 Claims, 7 Drawing Sheets

(56) References Cited

U.S. PATENT DOCUMENTS

| | | | |
|---|---|---|---|
| 2011/0003614 A1* | 1/2011 | Langereis | G01S 15/06 455/550.1 |
| 2011/0067075 A1* | 3/2011 | Barry | H04L 12/282 725/109 |
| 2011/0208520 A1* | 8/2011 | Lee | G10L 25/78 704/233 |
| 2012/0052872 A1* | 3/2012 | Do | G01S 5/18 455/456.1 |
| 2012/0224706 A1 | 9/2012 | Hwang | |
| 2012/0253819 A1* | 10/2012 | Hasegawa | G10L 25/51 704/270 |
| 2012/0263020 A1* | 10/2012 | Taylor | G01S 5/18 367/124 |
| 2013/0078976 A1* | 3/2013 | Naftolin | H04M 1/72569 455/418 |
| 2013/0163768 A1* | 6/2013 | Salter | H04R 29/00 381/56 |
| 2013/0297926 A1* | 11/2013 | Eaton | H04M 1/72569 713/100 |
| 2013/0331067 A1* | 12/2013 | Coussemaeker | G06Q 10/10 455/412.2 |
| 2013/0336093 A1* | 12/2013 | Suvanto | G01S 15/06 367/99 |
| 2014/0029384 A1* | 1/2014 | Dahl | G06F 1/1626 367/95 |
| 2014/0112487 A1* | 4/2014 | Laska | H04M 9/082 381/66 |
| 2014/0161270 A1* | 6/2014 | Peters | G10L 25/51 381/63 |
| 2014/0172429 A1* | 6/2014 | Butcher | G10L 19/018 704/270 |
| 2014/0269193 A1* | 9/2014 | Junkar | G01S 3/80 367/99 |
| 2014/0270254 A1* | 9/2014 | Oishi | H04R 3/04 381/98 |
| 2014/0274159 A1* | 9/2014 | Bernheim Brush | G06F 17/18 455/456.4 |
| 2016/0044394 A1* | 2/2016 | Derom | H04R 1/00 367/95 |
| 2016/0091308 A1* | 3/2016 | Oliaei | G01B 17/00 367/89 |

* cited by examiner

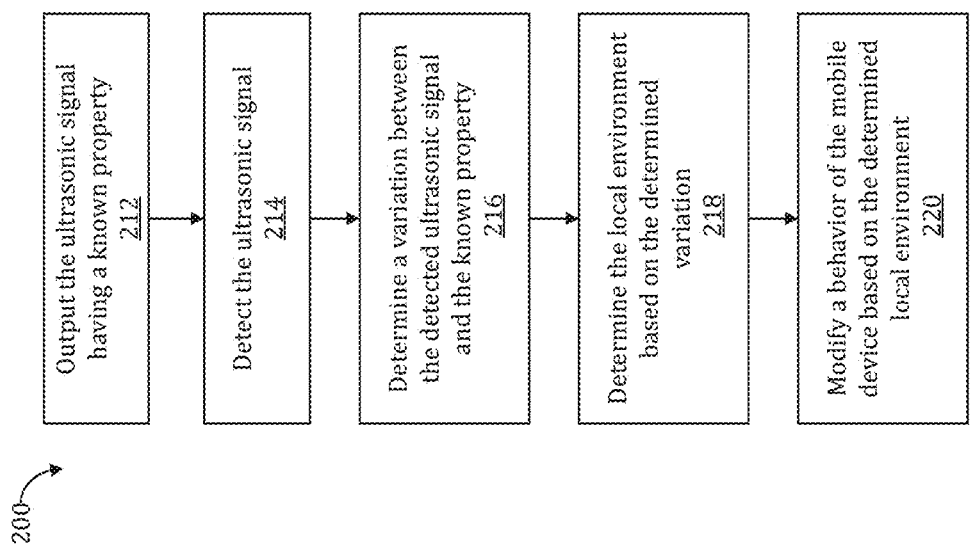

MOBILE DEVICE ENVIRONMENT DETECTION USING AN AUDIO SENSOR AND A REFERENCE SIGNAL

TECHNICAL FIELD

The present disclosure generally relates to mobile devices, and particularly to a method and system for determining the local environment of a mobile device.

BACKGROUND

Mobile devices have become ubiquitous in modern life. Current generations of mobile devices have fast multicore processors, high resolution displays, and are frequently connected to the internet via cellular or WI-FI signals. Despite the increased capabilities of mobile devices, mobile devices typically operate without regard for their local environment.

SUMMARY

Currently, mobile devices display notifications independent of whether the mobile device is located in a bag or is being viewed by a user. Displaying notifications when located in a bag, like many other functions performed by mobile devices, decrease the battery life of the mobile device without providing a benefit to the user.

A mobile device capable of determining its local environment is needed. By detecting the local environment, a mobile device could modify its settings (e.g., ring volume, vibrate, etc.) in order to improve battery life and the user experience.

The present disclosure provides a mobile device configured to modify the mobile device's behavior based on a variation between detected sound waves and a reference signal.

The present disclosures provides in a first embodiment a mobile device configured to (1) determine if the mobile device is covered (including properties of any covering material) based on a comparison of sound detected by the mobile device's audio sensor to sound detected by an exterior audio sensor and (2) modify the mobile device's behavior based on the determination.

The present disclosures provides in a second embodiment a mobile device configured to modify the mobile device's behavior based on a variation between a detected ultrasound signal and a known property of the ultrasound signal.

According to one aspect of the disclosure there is provided a mobile device configured to determine a local environment of the mobile device. The mobile device includes a device audio sensor configured to detect sound waves and a processor. The processor is configured to determine a variation between the detected sound waves and a reference signal. The processor is also configured to determine the local environment of the mobile device based on the determined variation. The processor is further configured to modify a behavior of the mobile device based on the determined local environment.

Alternatively or additionally, the device further includes a communication interface configured to receive a sound frequency profile outside the local environment. The device audio sensor is configured to output a device sound frequency profile representing sound from the local environment of the mobile device detected by the device audio sensor and the reference signal comprises the sound frequency profile outside the local environment.

According to a further aspect of the disclosure, there is provided a system including the mobile device and an ultrasonic device configured to output an ultrasonic signal having a known property. The device audio sensor is configured to detect the ultrasonic signal output by the ultrasonic device and the reference signal comprises the known property of the detected ultrasonic signal.

According to one aspect of the disclosure, there is provided a mobile device configured to determine a local environment of the mobile device. The mobile device includes a communication interface configured to receive an sound frequency profile outside the local environment. The mobile device also includes a device audio sensor configured to output a device sound frequency profile representing sound from the local environment of the mobile device detected by the device audio sensor. The mobile device further includes a processor configured to: determine a variation between the sound frequency profile outside the local environment and the device sound frequency profile, determine the local environment of the mobile device based on the determined variation, and modify a behavior of the mobile device based on the determined local environment.

Alternatively or additionally, the sound frequency profile outside the local environment represents sound detected by an environment audio sensor separate from and located at a distance from the mobile device.

Alternatively or additionally, the environment audio sensor is included in a watch that is communicatively coupled to the mobile device via the communication interface in order to communicate the sound frequency profile outside the local environment.

Alternatively or additionally, the environment audio sensor is a audio sensor located in a general vicinity but separate from a user of the mobile device.

Alternatively or additionally, the determining of the local environment comprises detecting if the mobile device is covered or uncovered.

Alternatively or additionally, if the mobile device is covered, the determining of the local environment additionally includes estimating at least one of a type of the material covering the mobile device, the density of the material covering the mobile device, or a thickness of the material covering the mobile device.

Alternatively or additionally, the processor determines that the mobile device is covered if the variation between the sound frequency profile outside the local environment and the device sound frequency profile is greater than a predetermined amount.

Alternatively or additionally, the variation between the sound frequency profile outside the local environment and the device sound frequency profile is determined by integrating over the mathematical difference between the device sound frequency profile and the sound frequency profile outside the local environment.

Alternatively or additionally, the variation between the sound frequency profile outside the local environment and the device sound frequency profile is determined based on a calculated damping profile representing a level of attenuation across a range of frequencies of the device sound frequency profile compared to the sound frequency profile outside the local environment.

Alternatively or additionally, the calculated damping profile comprises a ratio of the sound frequency profile outside the local environment and the device sound frequency profile.

Alternatively or additionally, if the processor determines that the mobile device is covered, the calculated damping profile is compared to stored damping profiles for various materials to determine a stored damping profile that the calculated damping profile is most similar to.

Alternatively or additionally, if the processor determines that the mobile device is covered, the calculated damping profile is compared to stored damping profiles for various materials to determine a set of the stored damping profiles that the calculated damping profile is most similar to.

Alternatively or additionally, the processor determines the set of the stored damping profiles that the calculated damping profile is most similar to by determining the set of the stored damping profiles that minimizes the following equation:

$$F(DP_d) = \text{abs}(DP_a - \Sigma_{i=1}^N DP_i),$$

where abs is the absolute value, $DP_d$ is the determined set of stored damping profiles including N of the stored damping profiles where N is an integer greater than or equal to one, $DP_a$ is the calculated damping profile, and $DP_i$ is the $i^{th}$ calculated damping profile in the determined set of stored damping profiles.

Alternatively or additionally, the processor determines the set of the stored damping profiles that the calculated damping profile is most similar to by determining the set of the stored damping profiles that minimizes the following equation:

$$F(DP_d, M_i) = \text{abs}(DP_a - \Sigma_{i=1}^N M_i * DP_i),$$

where abs is the absolute value, * represents multiplication, $DP_d$ is the determined set of stored damping profiles including N of the stored damping profiles where N is an integer greater than or equal to one, M is a set of multiplicative factors applied to the determined set of stored damping profiles, $DP_a$ is the calculated damping profile, $DP_{d,i}$ is an $i^{th}$ damping profile in the determined set of stored damping profiles, and $M_i$ is a $i^{th}$ multiplicative factor applied to the $i^{th}$ damping profile.

Alternatively or additionally, modifying the behavior of the mobile device includes at least one of: changing a ringer volume of the mobile device, setting a vibrating mode of the mobile device, setting a behavior of a display of the mobile device, setting a behavior of displaying notifications to a user of the mobile device, turning off a display of the mobile device while the mobile device is determined to be covered, increasing the ringer volume of the mobile device while the mobile device is determined to be in a bag, turning off vibrate while the mobile device is determined to be in a bag, or reducing the ringer volume of the mobile device while the mobile device is determined to be uncovered.

Alternatively or additionally, the processor further configured to: access a frequency response of the device audio sensor, receive a frequency response of the environment audio sensor, and normalize the sound frequency profile outside the local environment and the device sound frequency profile based on the frequency response of the environment audio sensor and the frequency response of the device audio sensor. The environment audio sensor measures the sound frequency profile outside the local environment.

Alternatively or additionally, the sound frequency profile comprises a representation of the sound pressure level over a range of sound frequencies.

Alternatively or additionally, the device additionally including a secondary device audio sensor configured to output a secondary device sound frequency profile representing sound from the local environment of the mobile device detected by the secondary device audio sensor. The processor is further configured to: determine a secondary variation comprising a variation between the sound frequency profile outside the local environment and the secondary device sound frequency profile, determine a secondary local environment of the mobile device based on the determined secondary variation, and modify the behavior of the mobile device based on the determined local environment and the determined secondary local environment.

According to another aspect of the disclosure, there is provided a method for determining a local environment of a mobile device. The method includes receiving an sound frequency profile outside the local environment, measuring a device sound frequency profile representing sound waves detected by a device audio sensor of the mobile device, determining a variation between the sound frequency profile outside the local environment and the device sound frequency profile, determining the local environment of the mobile device based on the determined variation, and modifying a behavior of the mobile device based on the determined local environment.

According to a further aspect of the disclosure, there is provided a server for determining a local environment of a mobile device. The server includes a network interface configured to receive: a device sound frequency profile representing sound from the local environment of the mobile device detected by a device audio sensor of the mobile device and an sound frequency profile outside the local environment representing sound detected by an environment audio sensor separate from and located at a distance from the mobile device. The server also includes a processor configured to: determine a variation between the sound frequency profile outside the local environment and the device sound frequency profile, determine the local environment of the mobile device based on the determined variation, generate a device property update based on the determined local environment, and cause the network interface to communicate the device property update to the mobile device. The device property update causes the mobile device to modify a behavior of the mobile device.

According to another aspect of the disclosure, there is provided a mobile device configured to determine a local environment of the mobile device. The mobile device includes an ultrasonic device configured to output an ultrasonic signal having a known property. The mobile device also includes a device audio sensor configured to detect the ultrasonic signal output by the ultrasonic device. The mobile device further includes a processor configured to: determine a variation between the detected ultrasonic signal and the known property of the ultrasonic signal; determine the local environment of the mobile device based on the determined variation; and modify a behavior of the mobile device based on the determined local environment.

Alternatively or additionally, the device audio sensor additionally outputs a device sound frequency profile representing sound from the local environment of the mobile device detected by the device audio sensor. Also, determining the local environment of the mobile device includes determining a sound frequency profile outside the local environment.

Alternatively or additionally, the sound frequency profile outside the local environment is determined by: determining a sound attenuation profile based on the determined variation between the detected ultrasonic signal and the known property of the ultrasonic signal and applying an inverse of the sound attenuation profile to the device sound frequency profile. The sound attenuation profile represents an attenuation of frequencies of sound represented in the device sound frequency profile.

Alternatively or additionally, the determined variation is determined by dividing the amplitude of the detected ultrasonic signal by an amplitude of the ultrasonic signal. Also, the amplitude of the ultrasonic signal is the known property of the ultrasonic signal. Additionally, the sound attenuation profile is determined by multiplying the determined variation by a conversion factor. Further, the conversion factor comprises at least one value representing a differential attenuation of the ultrasonic signal compared to attenuation of the frequencies of sound represented in the device sound frequency profile.

A number of features are described herein with respect to embodiments of the disclosure; it will be appreciated that features described with respect to a given embodiment also may be employed in connection with other embodiments.

The disclosure includes the features described herein, including the description, the annexed drawings, and, if appended, the claims, which set forth in detail certain illustrative embodiments. These embodiments are indicative, however, of but a few of the various ways in which the principles of the disclosure may be employed.

BRIEF DESCRIPTION OF THE DRAWINGS

FIG. 4 represents a flow diagram depicting a method for determining a local environment of a mobile device according to a second embodiment.

DETAILED DESCRIPTION

The present disclosures provides a mobile device configured to modify the mobile device's behavior based on the local environment of the mobile device. The mobile device determines the local environment based on a comparison of sound detected by the mobile device's audio sensor and a reference signal.

The present disclosures provides in a first embodiment a mobile device configured to modify the mobile device's behavior based on the local environment of the mobile device. The mobile device determines the local environment based on a comparison of sound detected by the mobile device's audio sensor to sound detected by an exterior audio sensor. In particular, the mobile device determines if it is covered and, if covered, the mobile device determines properties of the covering material.

The present disclosures provides in a second embodiment a mobile device configured to modify the mobile device's behavior based on the local environment of the mobile device. The mobile device determines the local environment based on a comparison of a detected ultrasonic signal detected by the mobile device's audio sensor to a known property of the ultrasonic signal when it was emitted by an ultrasonic device. In particular, the mobile device varies its behavior based on the determined local environment.

Figure 1:
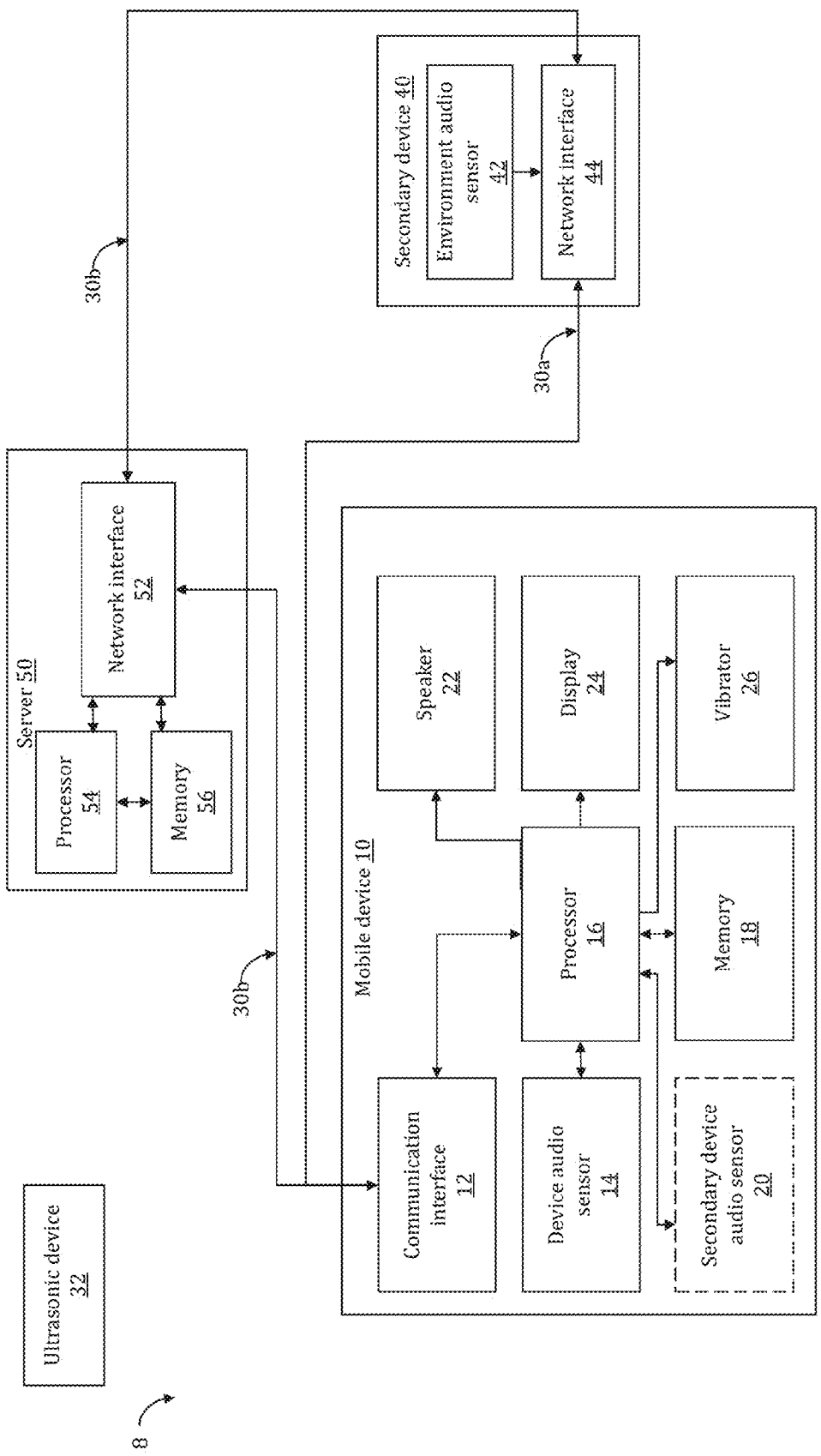
FIG. 1 is a representation of an exemplary system including a mobile device, a secondary device, and a server.

Turning to FIG. 1, a mobile device 10 configured to determine a local environment of the mobile device is shown. The mobile device 10 includes a device audio sensor 14 and a processor 16. The device audio sensor 14 detects sound waves. The processor 16 determines a variation between the detected sound waves and a reference signal. The processor 16 determine the local environment of the mobile device 10 based on the determined variation and modifies a behavior of the mobile device 10 based on the determined local environment.

In the first embodiment, the system 8 includes a mobile device 10 configured to determine a local environment of the mobile device. The mobile device 10 includes a communication interface 12, a device audio sensor 14, and a processor 16. The device audio sensor 14 outputs a device sound frequency profile 60 (FIG. 2A) representing sound from the local environment of the mobile device 10 that was detected by the device audio sensor 14. The system also includes a secondary device 40 including an environment audio sensor 42 and a network interface 44. The communication interface 12 of the mobile device 10 receives a sound frequency profile outside the local environment 62 (FIG. 2A) from the secondary device 40. The processor 16 compares the device sound frequency profile 60 to the sound frequency profile outside the local environment 62 in order to determine the local environment of the mobile device 10. The processor also modifies the behavior of the mobile device 10 based on the determined local environment. As described later, the system 8 may also include a server 50 having a network interface 52, a processor 54, and a memory 56.

In the second embodiment, the system 8 includes the mobile device 10 and an ultrasonic device 32. The ultrasonic device 32 is configured to output an ultrasonic signal having a known property. The device audio sensor 14 is configured to detect the ultrasonic signal and output a representation of the ultrasonic signal. The processor 16 compares the detected ultrasonic signal to the known property of the ultrasonic signal in order to determine the local environment of the mobile device 10. As described above, the processor 16 also modifies the behavior of the mobile device 10 based on the determined local environment.

Figure 2A:
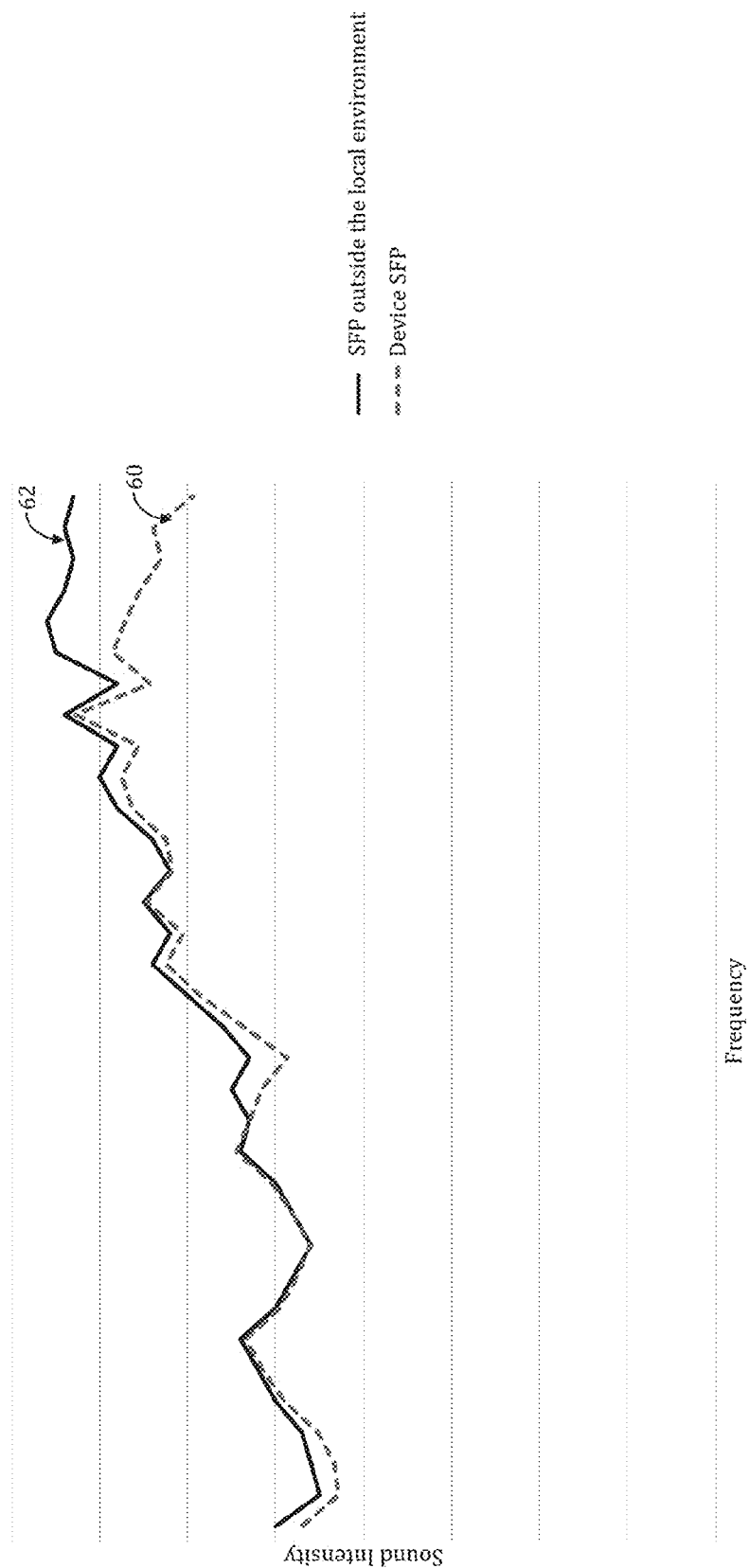
FIG. 2A is a chart representing an exemplary device sound frequency profile and an exemplary sound frequency profile outside the local environment.

Turning to the first embodiment and FIG. 2A, an exemplary device sound frequency profile 60 and exemplary sound frequency profile outside the local environment 62 are shown. The device sound frequency profile 60 and the sound frequency profile outside the local environment 62 represent sound from the local environment and the macro environment, respectively, of the mobile device 10. That is, the device audio sensor 14 is configured to output a device sound frequency profile 60 representing sound from the local environment of the mobile device 10 detected by the device audio sensor 14. For example, if the mobile device 10 is located in a user's pocket, the local environment would be the interior of the user's pocket including the sound passing from the macro environment (i.e., the environment outside of the user's pocket), through the material of the user's pants, and into the user's pocket. The local environment may comprise the immediate vicinity of the mobile device 10. For example, the local environment may comprise a bubble having a diameter less than any of 5 inches, 2 inches, or 1 inch. Similarly, the sound frequency profile outside the local environment 62 represents sound detected by an environment audio sensor 42 separate from and located at a distance from the mobile device 10. The environment audio sensor 42 may detect sounds present in the macro environment. The sound frequency profiles 60, 62 may be a representation of the sound pressure level over a range of sound frequencies.

The communication interface 12 of the mobile device 10 is configured to receive the sound frequency profile outside the local environment 62. The mobile device 10 may receive the sound frequency profile outside the local environment 62 from the secondary device 40 via a connection 30*a* between the communication interface 12 and the network interface 44. The communication interface 12 and the network interface 44 may be connected via a wireless connection, such as a Bluetooth, Wi-Fi, infrared, near field communication (NFC), or any other suitable wireless connection. As shown in FIG. 1, the connection 30*a* between the mobile device 10 and the secondary device 40 may be a direct connection between the communication interface 12 and the network interface 44. Alternatively, the connection 30*b* may be an indirect connection with another device (e.g., a server 50) located between the mobile device 10 and the secondary device 40. For example, the mobile device 10 may receive the sound frequency profile outside the local environment 62 via the Internet and from the server 50 after the secondary device 40 uploads the sound frequency profile outside the local environment 62 to the server 50.

As will be understood by one of ordinary skill in the art, the communication interface 12 and the network interfaces 44, 52 may comprise a wireless network adaptor, an Ethernet network card, a Bluetooth adaptor, or any suitable device that provides an interface between the mobile device 10, the secondary device 40, and/or the server 50. The communication interface 12 may be communicatively coupled to the computer readable medium 18 (e.g., a memory 18), such that the communication interface 12 is able to store received data on the computer readable medium 18 and transmit data stored on the computer readable medium 18. The communication interface 12 may also be communicatively coupled to the processor 16 such that the processor 16 is able to control operation of the communication interface 12. The communication interface 12, computer readable medium 18, and processor 16 may be communicatively coupled through a system bus, mother board, or using any other suitable manner as will be understood by one of ordinary skill in the art.

Continuing the example where the mobile device 10 is located in a user's pocket, the secondary device 40 may be a watch worn by the user of the mobile device 10. That is, the environment audio sensor 42 may be included in a watch that is communicatively coupled to the mobile device 10 via the communication interface 12 in order to communicate the sound frequency profile outside the local environment 62. Because the environment audio sensor 42 is located at a distance from the mobile device 10 and presumably not in the user's pocket, the environment audio sensor 42 will detect a different sound spectrum than the device audio sensor 14. For this reason, in this example, the sound frequency profile outside the local environment 62 will be different than the device sound frequency profile 60. That is, the sound spectrum detected by the environment audio sensor 42 will be attenuated by the user's clothing before being detected by the device audio sensor 14. This difference between the sound frequency profile outside the local environment 62 and the device sound frequency profile 60 is shown in FIG. 2A.

As will be understood by one of ordinary skill in the art, the secondary device 40 is not limited to a audio sensor located on the user of the mobile device 10. Rather, the environment audio sensor 42 may be a microphone located in a general vicinity but separate from a user of the mobile device. That is, the secondary device 40 may be any suitable device including a microphone positioned to detect sound in the general vicinity of the mobile device 10 and that is in communication with the mobile device 10. For example, the secondary device 40 may be a security camera located in a store that is configured to upload the sound frequency profile outside the local environment 62 to a server that is in communication with the mobile device 10. In this example, the communication interface 12 of the mobile device 10 is connected to the server 50 via the Internet and the secondary device 40 uploads the sound frequency profile outside the local environment 62 to the server 50.

With further reference to FIG. 2A, the device sound frequency profile 60 differs from the sound frequency profile outside the local environment 62 in that certain frequencies of sound have been attenuated. The processor 16 is configured to determine the variation between the sound frequency profile outside the local environment 62 and the device sound frequency profile 60. Based on the determined variation between the sound frequency profile outside the local environment 62 and the device sound frequency profile 60, the processor 16 is configured to determine the local environment of the mobile device 10.

It is possible to determine the local environment of the mobile device 10 based on the difference between the sound frequency profile outside the local environment 62 and the device sound frequency profile 60, because the attenuation of the sound frequency profile outside the local environment 62 is a characteristic of the local environment of the mobile device 10. That is, if the mobile device 10 is located in a pocket such that a layer of cotton is between the device audio sensor 14 and the environment audio sensor 42, then the difference between the sound frequency profile outside the local environment 62 and the device sound frequency profile 60 will be related to the damping profile 70 of this layer of cotton. In other words, the difference between the sound frequency profile outside the local environment 62 and device sound frequency profile 60 is related to the material located between the device audio sensor 14 and the environment audio sensor 42.

Turning again to FIG. 2A, determining the local environment of the mobile device 10 may include detecting if the mobile device 10 is covered or uncovered. The processor 16 may determine that the mobile device 10 is covered if the determined variation between the sound frequency profile outside the local environment 62 and the device sound frequency profile 60 is greater than a predetermined amount. That is, the processor 16 may determine if the mobile device 10 is covered based on the determined variation between the sound frequency profile outside the local environment 62 and the device sound frequency profile 60. If the variation between the sound frequency profile 62 and the device sound frequency profile 60 is greater than or equal to a given threshold, then the processor 16 may determine that the mobile device 10 is covered. If, however, the variation between the sound frequency profile 62 and the device sound frequency profile 60 is less than a given threshold, then the processor 16 may determine that the mobile device 10 is uncovered. The variation between the sound frequency profile outside the local environment 62 and the device sound frequency profile 60 may be determined by integrating over the mathematical difference between the device sound frequency profile 60 and the sound frequency profile outside the local environment 62. The difference between the sound frequency profile 62 and the device sound frequency profile 60 may be determined by calculating the error, variance, standard deviation, least square error, or using any other suitable measurement.

As will be understood by one of ordinary skill in the art, "covered" may refer to the entire mobile device 10 being located in a bag or pocket, an object lying on a portion of the mobile device 10, the mobile device 10 lying on an object, an object obscuring the device audio sensor 14, etc.

As described in further detail below, if the mobile device 10 is determined to be covered, then determining the local environment of the mobile device 10 may additionally include estimating at least one of a type of material covering the mobile device 10, the density of the material covering the mobile device 10, or a thickness of the material covering the mobile device.

Figure 2B:
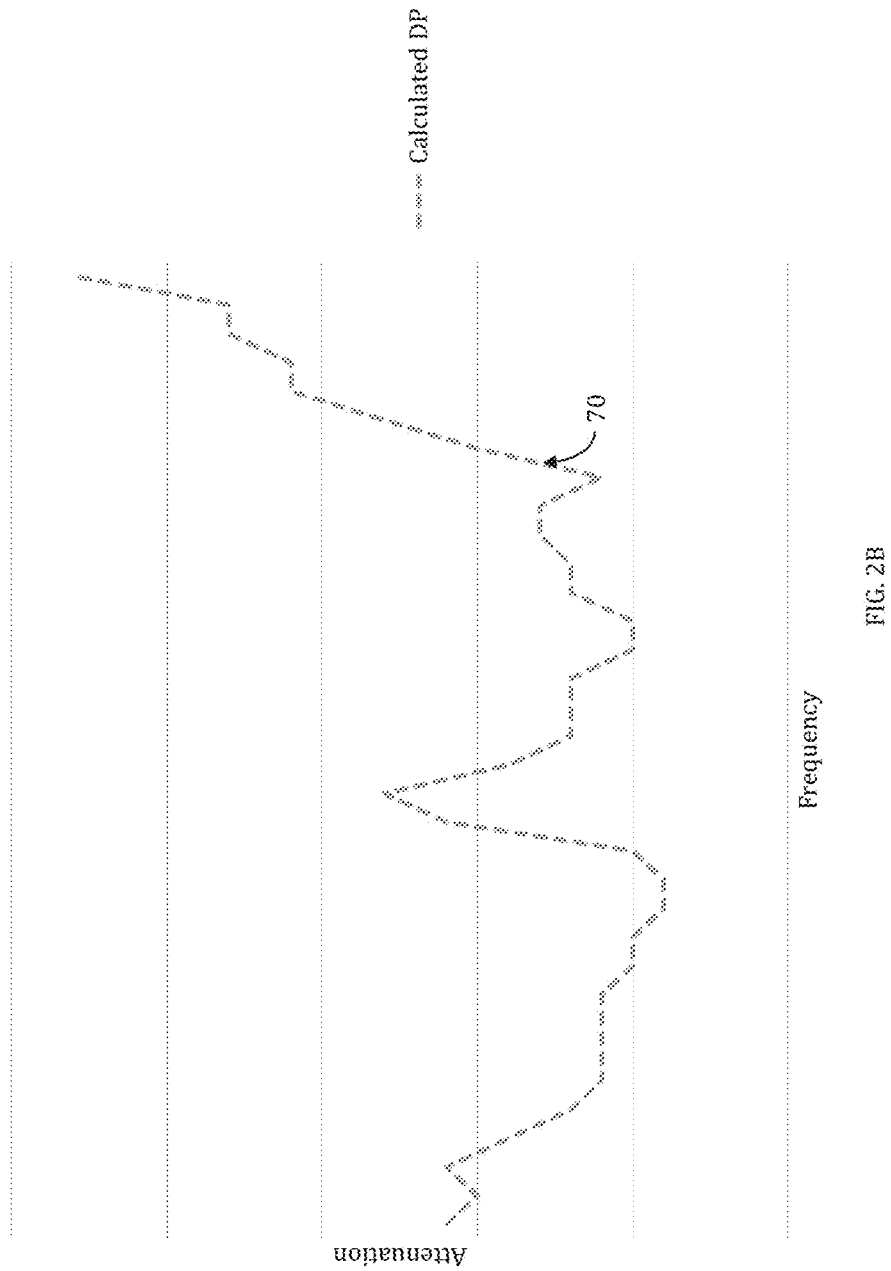
FIG. 2B is a chart representing the damping profile calculated from the sound frequency profiles of FIG. 2A.

With additional reference to FIG. 2B, the mobile device 10 may determine the local environment based on a calculated damping profile 70. That is, the mobile device 10 may determine the variation between the sound frequency profile outside the local environment 62 and the device sound frequency profile 60 based on a calculated damping profile 70. The calculated damping profile 70 may represent a level of attenuation across a range of frequencies of the device sound frequency profile 60 compared to the sound frequency profile outside the local environment 62.

The calculated damping profile 70 illustrated in FIG. 2B was calculated as a ratio of the sound frequency profile outside the local environment 62 and the device sound frequency profile 60 shown in FIG. 2A. As will be understood by one of ordinary skill in the art, calculating the damping profile 70 is not limited to a ratio of the sound frequency profile outside the local environment 62 and the device sound frequency profile 60, but rather may be calculated in any suitable manner.

Figure 2C:
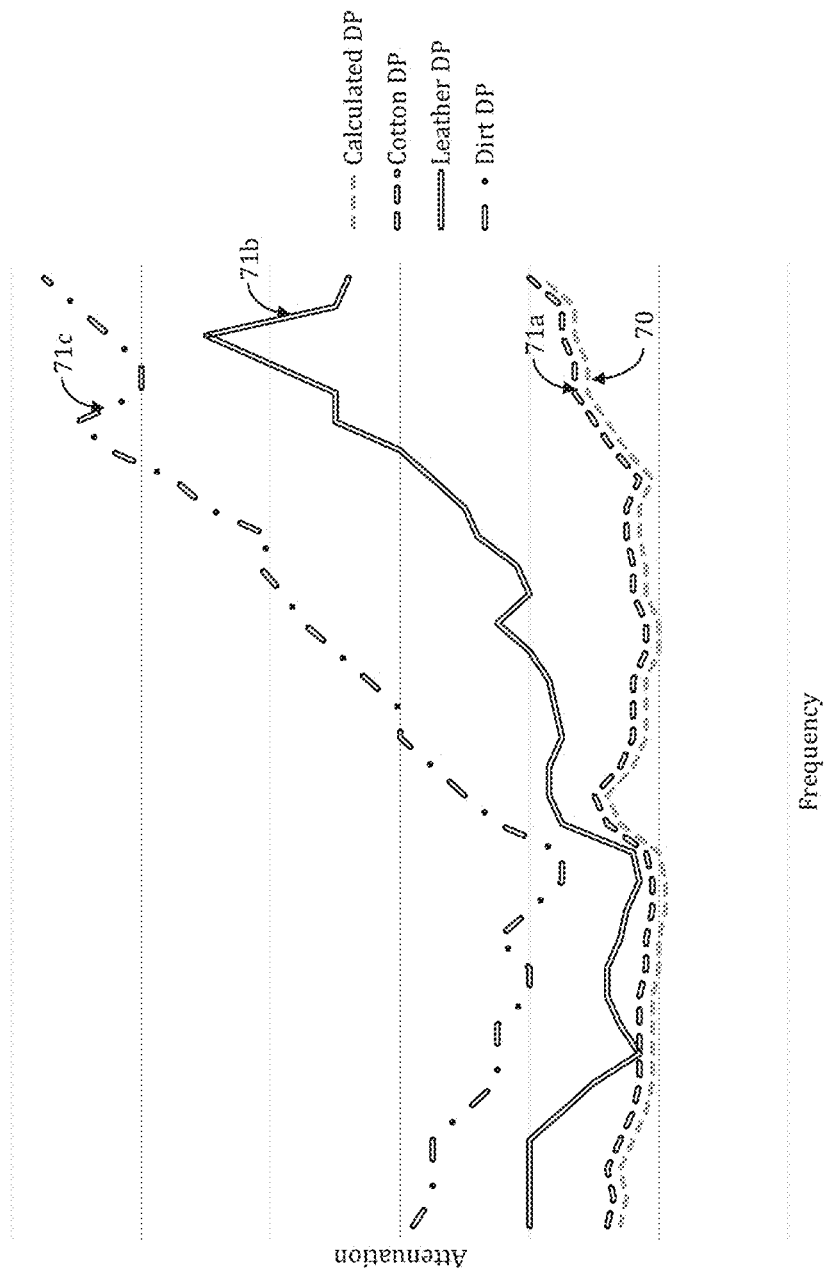
FIG. 2C is a chart representing exemplary damping profiles for various materials and the calculated damping profile of FIG. 2B.

With additional reference to FIG. 2C, if the processor 16 determines that the mobile device is covered, the calculated damping profile 70 may be compared to stored damping profiles 71 for various materials to determine the stored damping profile 71 that the calculated damping profile 70 is most similar to. For example, the processor 16 may determine a set of the stored damping profiles 71 that the calculated damping profile 70 is most similar to. Similarity between the calculated damping profile 70 and the stored damping profiles 71 may be determined using any suitable measure of similarity. For example, similarity may refer to the standard deviation, variance, error, least square error, or Euclidian distance.

As will be understood by one of ordinary skill in the art, the stored damping profiles 71 may be stored in the non-transitory computer readable medium 18 of the mobile device 10. The mobile device 10 may also receive the stored damping profiles 71 from the server 50.

Exemplary stored damping profiles 71 are shown in FIG. 2C. The exemplary stored damping profiles 71 include a stored damping profile 71a for cotton, a stored damping profile 71b for leather, and a stored damping profile 70c for dirt. As is visible in the figure, the frequencies attenuated by the different materials and the amount of attenuation caused by these materials varies between different materials. In this example, there are stored damping profiles 71 for three different materials. But, as will be understood by one of ordinary skill in the art, the stored damping profiles 71 described in this disclosure are not limited to those displayed in FIG. 2B. Additionally, there may be multiple stored damping profiles 71 for a single material. For example, a thick cotton layer may have a different stored damping profile 71 than a thin cotton layer. For this reason, there may be multiple damping profiles 70 for different thickness layers of the same material. Further, the stored damping profile 71 for a material (e.g., cotton) may vary depending on the composition of the material, how the material was processed, the weave of the material, etc. For this reason, a single material may have multiple profiles to account for, e.g., different thicknesses in the materials, different compositions of the materials, or any other specific properties of the particular material being represented.

With continued reference to FIG. 2C and continuing the example of a mobile device located in a user's pocket, the processor 16 may determine the local environment of the mobile device 10 by determining which of the stored damping profiles 71a-c that the calculated damping profile 70 is most similar to. FIG. 2C shows the stored damping profiles 71a-c for cotton, leather, and dirt, respectively. By comparing the calculated damping profile 70 to the stored damping profiles 71a-c, the processor 16 may determine the material covering the mobile device 10. As is apparent from the figure, the calculated damping profile 70 is most similar to the stored damping profile 71a for cotton. In this way, the mobile device 10 may determine that the device audio sensor 14 is covered by cotton.

Figure 2D:
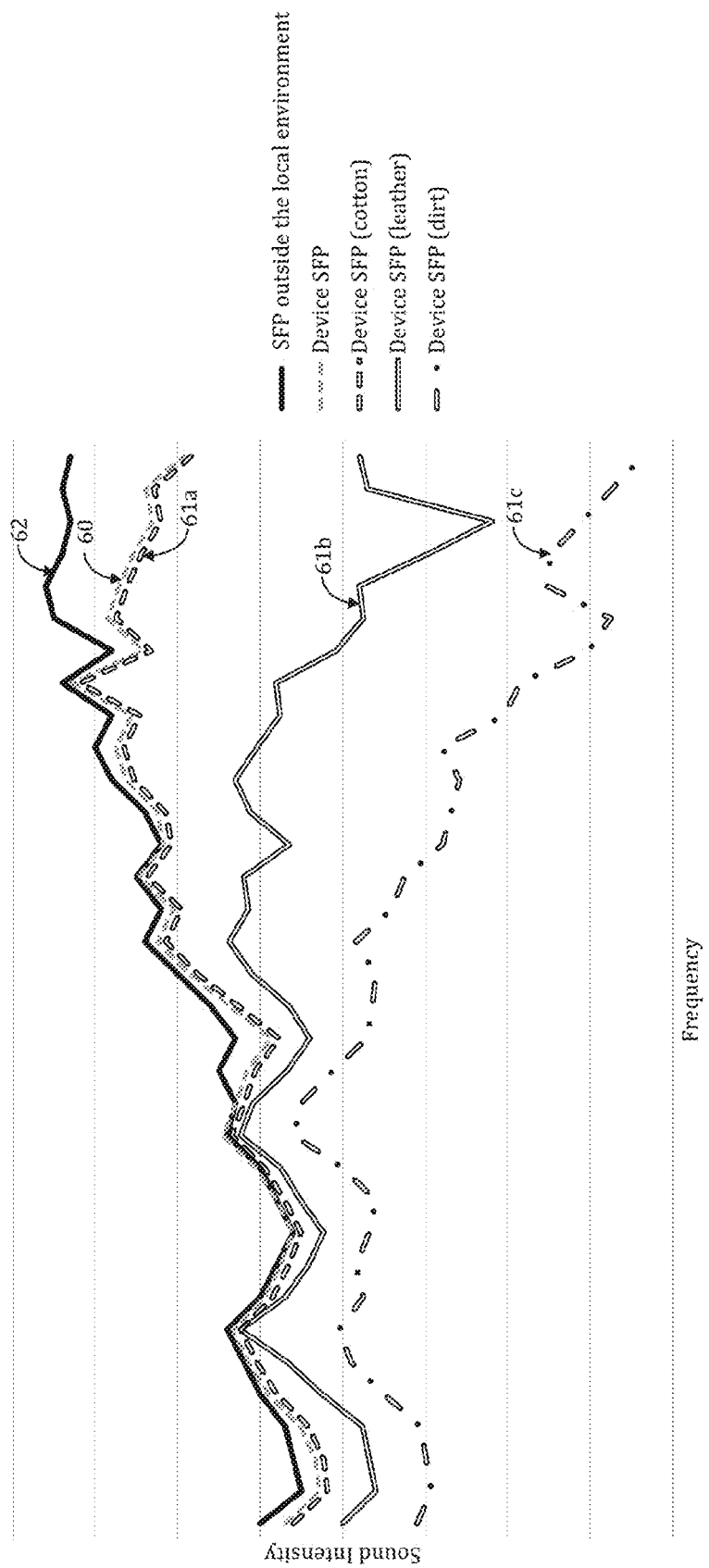
FIG. 2D is a chart representing exemplary device sound frequency profiles based on the damping profiles of FIG. 2C and the exemplary sound frequency profiles of FIG. 2A.

In an alternative embodiment, the mobile device 10 may determine its local environment (in particular a material covering the device audio sensor 14) by applying the stored damping profiles 71a-c shown in FIG. 2C to the sound frequency profile outside the local environment 62. That is, the mobile device 10 may apply the stored damping profiles 71a-c to the sound frequency profile outside the local environment 62 to determine which damping profile 70, when applied to the sound frequency profile outside the local environment 62, results in the closest match to the device sound frequency profile 60. FIG. 2D shows the result of applying each stored damping profile 71 in FIG. 2C to the sound frequency profile outside the local environment 62 in FIG. 2A.

With reference to FIG. 2D, the sound frequency profile outside the local environment 62 and the calculated sound frequency profile 61a-c are shown. The calculated sound frequency profile 61a-c are the result of applying the stored damping profiles 71a-c to the device sound frequency profile 60. As is apparent from the figure, applying the stored damping profile 71a for cotton results in a calculated sound frequency profile 61a that is the most similar to the device sound frequency profile 60. In this way, the mobile device 10 may determine that it is covered by cotton.

As opposed to determining an individual stored damping profile 71, the processor 16 may determine a set of the stored damping profiles 71 that the calculated damping profile 70 is most similar to. The processor 16 may make this determination by determining the set of the stored damping profiles that minimizes the following equation:

$$F(DP_d) = \text{abs}(DP_a - \Sigma_{i=1}^{N} DP_i) \qquad \text{Equation 1}$$

where abs is the absolute value, $DP_d$ is the determined set of stored damping profiles including N of the stored damping profiles where N is an integer greater than or equal to one, $DP_a$ is the calculated damping profile, and $DP_i$ is the $i^{th}$ calculated damping profile in the determined set of stored damping profiles.

By using equation 1, it is possible to detect when the mobile device 10 is covered by layers of different fabrics. For example, if the mobile device 10 is in the shirt pocket of a user wearing a leather coat, equation 1 can be used to identify that the mobile device 10 is covered by a layer of cotton and a layer of leather.

In another embodiment, the processor may determine the set of the stored damping profiles that the calculated damping profile is most similar to by determining the set of the stored damping profiles that minimizes the following equation:

$$F(DP_a, M_i) = \text{abs}(DP_a - \Sigma_{i=1}^{N} M_i * DP_i) \quad \text{Equation 2}$$

where abs is the absolute value, * represents multiplication, $DP_d$ is the determined set of stored damping profiles including N of the stored damping profiles where N is an integer greater than or equal to one, M is a set of multiplicative factors applied to the determined set of stored damping profiles, $DP_a$ is the calculated damping profile, $DP_{d,i}$ is an $i^{th}$ damping profile in the determined set of stored damping profiles, and $M_i$ is a $i^{th}$ multiplicative factor applied to the $i^{th}$ damping profile.

By using equation 2, it may be possible to more accurately determine the layers of material covering the mobile device 10 using fewer stored damping profiles 71 at the expense of using more computing power.

In order to identify different thicknesses of the same material using equation 1, it may be necessary to include multiple stored damping profiles 71 for a single material. For example, a cotton shirt may result in less attenuation of an sound frequency profile outside the local environment 62 compared to a cotton jacket. For this reason, in order to accurately identify the material covering the mobile device 10, it may be necessary to store a damping profile 70 for a thin layer of cotton corresponding to a shirt, a thicker layer of cotton corresponding to a sweatshirt, and an even thicker layer of cotton corresponding to a jacket.

Conversely, by using multiplicative factors (M) in equation 2, it may be possible to represent a cotton shirt, a cotton sweatshirt, and a cotton jacket using a single stored damping profile 71 and different multiplicative factors. In this example, the different multiplicative factors may correspond to the relative thickness of the layers of cotton.

In the second embodiment, the ultrasonic device 32 is configured to output an ultrasonic signal having a known property. The ultrasonic device 32 may comprise any device capable of emitting an ultrasonic signal. For example, the ultrasonic device 32 may comprise a speaker capable of emitting sound having a frequency greater than 20 kHz. In one example, the ultrasonic device 32 comprises an ultrasonic beacon that emits the ultrasonic signal at regular intervals. The ultrasonic device 32 may be included in an accessory configured to be worn on a user of the mobile device. For example, the ultrasonic device may be included in a pin worn by the user.

The ultrasonic signal may comprise sound (i.e., pressure waves) not audible to human ears. For example, the ultrasonic signal may comprise sound having a frequency greater than 20 kHz.

The processor 16 is configured to determine a variation between the detected ultrasonic signal and the known property of the ultrasonic signal. The known property of the ultrasonic signal may include an amplitude of the ultrasonic signal. For example, when emitted by the ultrasonic device 32, the ultrasonic signal may be composed primarily of a single frequency or a small range of frequencies having a known amplitude. As will be understood by one of ordinary skill in the art, amplitude may refer to the peak magnitude of the ultrasonic signal. The magnitude of the ultrasonic signal may be measured in joules, pressure, or using any suitable units.

When describing a property as "known" this may refer to a calibrated output. For example, the ultrasonic device 32 may be calibrated to emit an ultrasonic signal having a given maximum amplitude reading. Alternatively, the mobile device 10 may detect and record the maximum amplitude of the detected ultrasonic signal over a given time period as the "known property" of the ultrasonic signal. For example, over a one day period of time, the mobile device 10 may record the maximum detected amplitude of the ultrasonic signal as the known property of the ultrasonic signal. In this way, if the properties of the ultrasonic signal change with time (e.g., the maximum amplitude decreases), the known property will be adjusted to ensure accurate results. For example, if the maximum amplitude decreases with time and the known property (the maximum amplitude in this example) is not adjusted, then the mobile device 10 may incorrectly estimate that the mobile device 10 is farther away from the ultrasonic device 10 than it actually is.

The device audio sensor 14 is configured to detect the ultrasonic signal and output a representation of the ultrasonic signal. The representation of the ultrasonic signal may comprise the detected amplitude of the ultrasonic signal for a series of time points. As will be understood by one of ordinary skill in the art, the representation of the ultrasonic signal may also include information regarding the frequency content of the ultrasonic signal. For example, the representation may include a detected amplitude for multiple different frequencies for a series of time points. The processor 16 compares the detected ultrasonic signal to the known property of the ultrasonic signal in order to determine the local environment of the mobile device 10. As described above, the processor 16 also modifies the behavior of the mobile device 10 based on the determined local environment.

As in the first embodiment, the device audio sensor 14 is also configured to detect and output a device sound frequency profile representing sound from the local environment of the mobile device detected by the device audio sensor.

As will be understood by one of ordinary skill in the art, the device audio sensor 14 may comprise any audio input device configured to detect sound waves and output properties of the detected sound waves. The properties of the sound waves output by the device audio sensor 14 may include the amplitude for one or more wavelength ranges in the detected sound waves.

The processor 16 is also configured to determine the local environment of the mobile device based on the determined variation. Determining the local environment of the mobile device 10 includes determining an sound frequency profile outside the local environment. The sound frequency profile outside the local environment may represent the sound located outside the immediate area of the mobile device 10. For example, if the mobile device 10 is located in an individual's pocket, then the sound frequency profile outside the local environment may refer to the sound located outside the individual's pocket. In this example, the environment sound frequency may refer to the sound that would be detected by the device audio sensor 14 if the device audio sensor 14 was located outside the user's pocket.

The processor 16 determines the sound frequency profile outside the local environment by determining a sound attenuation profile and applying an inverse of the sound attenuation profile to the device sound frequency profile. The sound attenuation profile is based on the determined variation between the detected ultrasonic signal and the known property of the ultrasonic signal. In this way, the sound attenuation profile represents an attenuation of frequencies of sound represented in the device sound frequency profile. For example, the determined variation may be determined by dividing the amplitude of the detected ultrasonic signal by the known property identifying an amplitude of the ultrasonic signal when emitted by the ultrasound device 32. The sound attenuation profile is determined by multiplying the determined variation by a conversion factor. The conversion factor comprises at least one value representing a differential attenuation of the ultrasonic signal compared to attenuation of the frequencies of sound represented in the device sound frequency profile.

For example, ultrasonic sound waves are more highly attenuated by some materials than sound waves having a smaller frequency. The difference in the attenuation of the ultrasonic signal and sound waves audible to humans is known for many materials. The conversion factor may represent the ratio of the attenuation of the ultrasonic signal and the attenuation of audible sound waves in common materials. For example, the ratio of the attenuation of the ultrasonic signal and the attenuation of audible sound waves may be determined for cotton, leather, denim, and other common materials. The conversion factor may be determined based on the average of the ratios of the attenuation of the ultrasonic signal and the attenuation of audible sound waves for the different materials.

If the ultrasonic signal is comprised of primarily a single frequency, then the conversion factor may comprise a single value. Conversely, if the ultrasonic signal is comprised of a range of frequencies, then the conversion factor may comprise multiple values, where each value is associated with a wavelength or range of wavelengths.

In both the first and the second embodiment, the processor 16 of the mobile device 10 is configured to modify a behavior of the mobile device 10 based on the determined local environment. The behavior modified may depend on the determined local environment.

For example, in the first embodiment the processor 16 may turn off a vibrator 26 if the mobile device 10 is determined to be in a bag. The processor 16 may also turn off a display 24 such that notifications are not displayed if the mobile device 10 is determined to be in a bag or a pocket. In this way, the processor 16 may modify the behavior of the mobile device to improve the battery life of the device and improve the user experience.

The processor 16 may also modify the behavior of the mobile device based on the local environment to improve the user experience by adjusting the volume of a speaker 22 that plays a ring tone. For example, in the first embodiment, if the mobile device 10 is determined to be in a user's pocket underneath a jacket, then the ring volume may be turned up to ensure that the user can hear the ringer. Alternatively, if the mobile device 10 is determined to be only covered by a thin layer of fabric, then the processor 16 may turn down the ring volume to make sure that the ringer isn't too loud and obtrusive to the macro environment that the user is located in.

For example, in the second embodiment, the processor 16 may change the ring volume based on the sound frequency profile outside the local environment. That is, the processor 16 may change the ring volume based on the amplitude of the sound frequency profile outside the local environment. For example, the ring volume may be adjusted based on the average or maximum amplitude of the sound frequency profile outside the local environment. In this way, the ring volume may be increased in a loud room and/or decreased in a quiet room.

In another example in the second embodiment, the processor 16 may change the ring volume based on the variation between the detected ultrasonic signal and the known property of the ultrasonic signal without regard for the sound frequency profile outside the local environment. For example, if a user is in another room from the mobile device 10, the detected ultrasonic signal may be much smaller than the amplitude of the ultrasonic signal when emitted from the ultrasonic device 32. In order to ensure that the user hears the ringer, the processor 16 may change the ring volume in proportion to the decrease in the detected ultrasonic signal relative to the known property of the ultrasonic signal. In this way, if a user and the ultrasonic device 32 are located at a distance from the mobile device 10, the ring volume may be increased in ensure that the user is able to hear the ringer. As will be understood by one of ordinary skill in the art, the processor 16 may modify the behavior of the mobile device 10 based on both the sound frequency profile outside the local environment and the determined variation. Modifying the behavior of the mobile device may include at least one of: changing a ringer volume of the mobile device, setting a vibrating mode of the mobile device, setting a behavior of a display of the mobile device, setting a behavior of displaying notifications to a user of the mobile device, turning off a display of the mobile device while the mobile device is determined to be covered, increasing the ringer volume of the mobile device while the mobile device is determined to be in a bag, turning off vibrate while the mobile device is determined to be in a bag, or reducing the ringer volume of the mobile device while the mobile device is determined to be uncovered.

In the first embodiment, as opposed to or in addition to modifying the behavior of the mobile device 10, the mobile device 10 may provide an indication of the local environment to the server 50 or the secondary device 40. For example, if a user cannot locate their mobile device 10, the user may query the location of the mobile device 10 using the secondary device 40 or another computer in communication with the server 50. In addition to supplying an estimated location of the mobile device 10 to the server 50 or secondary device 40, the mobile device 10 may also provide an indication of the local environment. For example, if the mobile device 10 is located in a pocket of jeans, the mobile device 10 may report that the phone is currently covered by a layer of denim.

In the first embodiment, depending on the properties of the device audio sensor 14 and the environment audio sensor 42, it may be necessary to calibrate the audio sensors relative to one another. For example, if the frequency response of the device audio sensor 14 differs from the frequency response of the environment audio sensor 42, it may be necessary to correct for this difference to ensure that the results of the determination of the local environment are accurate. For example, if the frequency response of the audio sensors is not accounted for, then the processor 16 may incorrectly determine that the device audio sensor 14 is covered due to the difference in the frequency response between the device audio sensor 14 and the environment audio sensor 42.

In order to correct for the frequency response of the device audio sensor 14 and the environment audio sensor 42, the mobile device 10 may access a frequency response of the device audio sensor 14 stored in the non-transitory computer readable medium 18. The mobile device 10 may also receive a frequency response of the environment audio sensor 42.

The mobile device 10 may receive the frequency response of the environment audio sensor 42 via the communication interface 12. The mobile device 10 may also normalize the sound frequency profile outside the local environment 62 and the device sound frequency profile 60 based on the frequency response of the environment audio sensor 42 and the frequency response of the device audio sensor 14. Normalization of the sound frequency profiles 60, 62 may be performed by the processor 16. Normalization may include multiplying the sound frequency profile outside the local environment 62 by the frequency response of the device audio sensor 14 and dividing the resultant product by the frequency response of the environment audio sensor 42. In another embodiment, normalization may include multiplying the device sound frequency profile 60 by the frequency response of the environment audio sensor 42 and dividing the resultant product by the frequency response of the device audio sensor 14. In still another embodiment, normalization may include may include dividing the device sound frequency profile 60 by the frequency response of the device audio sensor 14 and dividing the sound frequency profile outside the local environment 62 by the frequency response of the environment audio sensor 42. As will be understood by one of ordinary skill in the art, normalization may be performed using any suitable technique or in any suitable manner.

The present disclosure also provides a method for determining a local environment of the mobile device 10. The method includes detecting sound waves using the device audio sensor 14. The method also includes determining a variation between the detected sound waves and a reference signal. The method further includes determining the local environment of the mobile device 10 based on the determined variation. The method additionally includes modifying a behavior of the mobile device 10 based on the determined local environment.

Figure 3:
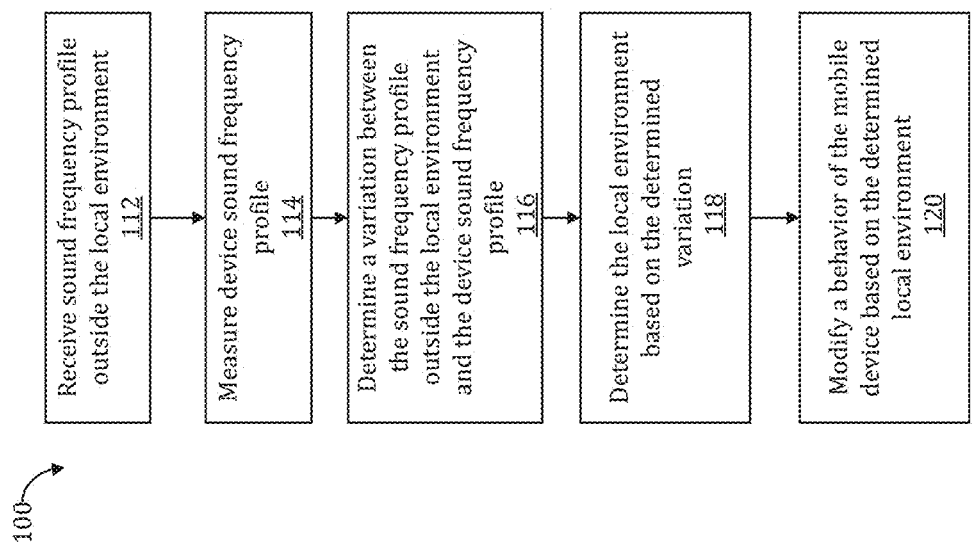
FIG. 3 represents a flow diagram depicting a method for determining a local environment of a mobile device according to a first embodiment.

With reference to FIG. 3, a method 100 for determining a local environment of the mobile device 10 according to the first embodiment is shown. As will be understood by one of ordinary skill in the art, the method may be performed by the processor 16 of the mobile device 10. The method 100 may also embody instructions stored on the non-transitory computer readable medium 18 that, when executed by the processor 16, cause the processor 16 to perform the steps of the method.

In process block 112, the sound frequency profile outside the local environment 62 is received. In process block 114, the device sound frequency profile 60 is measured. As described previously, the device sound frequency profile represents sound waves detected by the device audio sensor of the mobile device.

In process block 116, a variation between the sound frequency profile outside the local environment and the device sound frequency profile is determined. Based on the determined variation, the local environment of the mobile device 10 is determined in process block 118. Finally, in process block 120, the behavior of the mobile device is modified based on the determined local environment.

Determining the local environment of the local device and determining the variation between the sound frequency profile outside the local environment and the device sound frequency profile is not limited to being determined by the processor 16 of the mobile device 10. For example, the determination may also be performed by a processor 54 of the server 50.

As shown in FIG. 1, the server 50 includes a network interface 52 configured to receive the device sound frequency profile 60 and the sound frequency profile outside the local environment 62. As described previously, the device sound frequency profile 60 represents sound from the local environment of the mobile device 10 detected by a device audio sensor 14 of the mobile device 10. Similarly, the sound frequency profile outside the local environment 62 represents sound detected by the environment audio sensor 42 separate from and located at a distance from the mobile device 10.

The server 50 also includes a processor 54 configured to determine a variation between the sound frequency profile outside the local environment 62 and the device sound frequency profile 60. The server 50 may determine the variation in the same manner that the mobile device 10 is described as determining the variation above.

The processor 54 of the server 50 is also configured to determine the local environment of the mobile device 10 based on the determined variation. The server 50 may determine the local environment in the same manner that the mobile device 10 is described as determining the local environment above. For example, the stored damping profile 71 may be stored in the non-transitory computer readable medium 56 (e.g., memory 56) of the server 50.

The processor 54 of the server 50 is further configured to generate a device property update based on the determined local environment. After generating the device property update, the processor 54 is configured to cause the network interface 52 to communicate the device property update to the mobile device 10. The device property update causes the mobile device 10 to modify a behavior of the mobile device 10. For example, the device property update may be received by the communication interface 12 of the mobile device 10 and executed by the processor 16 of the mobile device 16 in order to modify the behavior of the mobile device 10.

Determining the variation and the local environment using the server 50 as opposed to the mobile device 10 may have the benefit of reducing rundown of a battery of the mobile device 10. Also, the processor 54 of the server may be faster and have more resources (e.g., more processing cores, a larger cache, more system memory, etc.) than the processor 16 of the mobile device 10. Alternatively, determining the variation and the local environment using the mobile device 10 as opposed to using the server 50 may have the benefit of not requiring an internet connection or using less of a user's data plan.

As will be understood by one of ordinary skill in the art, both the device audio sensor 14 and the environment audio sensor 42 measure a sound frequency profile representing sound waves detected by the respective audio sensor. The device audio sensor 14 and the environment audio sensor 42 may both be acoustic-to-electric transducers or sensors that convert sound in air into an electrical signal. As will be understood by one of ordinary skill in the art, the device audio sensor 14 and the environment audio sensor 42 may be any suitable device for detecting sound.

The mobile device 10 may additionally include a secondary device audio sensor 20. The secondary device audio sensor 20 is configured to provide to output (e.g., provide to the processor 16) a secondary device sound frequency profile representing sound from the local environment of the mobile device 10 as detected by the secondary device audio sensor 20.

The secondary device audio sensor 20 may be used to differentiate between when the mobile device 10 is located within an enclosed space and when the mobile device 10 is positioned in the open with the device audio sensor 14 covered. For example, if the device audio sensor 14 faces the front surface of the mobile device 10 and the mobile device 10 is face down on a pile of clothes, then the mobile device 10 may mistakenly determine that the mobile device 10 is located in a user's pocket under a heavy coat. Depending on the settings of the mobile device 10, this may result in the behavior of the mobile device 10 being modified such that the volume of the speaker 22 that emits the ring tone is increased. Increasing the ringer volume would make it easier to hear the mobile device 10 if located under a thick coat, but may result in the ring volume being made too loud when the mobile device is not covered, but is only lying face down.

The processor 16 of the mobile device is configured to determine a secondary variation comprising a variation between the sound frequency profile outside the local environment and the secondary device sound frequency profile. The processor 16 is also configured to determine a secondary local environment of the mobile device based 10 on the determined secondary variation. The processor 16 may then modify the behavior of the mobile device 10 based on the determined local environment (i.e., determined based on the sound frequency profile output by the device audio sensor 14) and the determined secondary local environment (i.e., determined based on the sound frequency profile output by the secondary device audio sensor 42).

By comparing both the device sound frequency profile 60 (i.e., output by the device audio sensor 14) and a secondary device sound frequency profile (i.e., output by the secondary device audio sensor 20) to the sound frequency profile outside the local environment 62, it is possible to determine if the mobile device 10 is located within a confined space. In this example, the method described above for determining the local environment of the mobile device may be separately performed on both the device sound frequency profile and the secondary device sound frequency profile. If both the secondary device sound frequency profile 60 and the device sound frequency profile 60 are both identified as covered by a material, then the mobile device 10 may be determined to be located within a confined area such as a pocket.

By determining the local environment using both the device sound frequency profile 60 and the secondary device sound frequency profile the mobile device 10 may more accurately modify the behavior of the mobile device. That is, if the secondary device audio sensor 20 and the speaker 22 are facing the same direction and the secondary device audio sensor 20 is determined to be covered, then the ringer volume may be increased. In this example, if the device audio sensor 14 is determined to be uncovered, then notifications may still be shown on the display 24. In this way, the behavior of the mobile device may be modified depending on whether the behavior being modified is dependent on an element affected by the front surface of the mobile device 10 being covered (e.g., the display) or an element affected by the back surface of the mobile device 10 being covered (e.g., a speaker).

Turning to FIG. 4, a method 200 for determining a local environment of the mobile device 10 according to the second embodiment is shown. As will be understood by one of ordinary skill in the art, the method may be performed by the processor 16 of the mobile device 10. The method 200 may also embody instructions stored on the non-transitory computer readable medium 18 that, when executed by the processor 16, cause the processor 16 to perform the steps of the method.

In process block 212, the ultrasonic signal having a known property is output. In process block 214, the ultrasonic signal is detected. As described previously, the ultrasonic signal is detected using a device audio sensor of the mobile device.

In process block 216, a variation between the ultrasonic signal and the known property of the ultrasonic signal is determined. Based on the determined variation, the local environment of the mobile device 10 is determined in process block 218. Finally, in process block 220, the behavior of the mobile device is modified based on the determined local environment.

As will be understood by one of ordinary skill in the art, the processors 16, 54 may have various implementations. For example, the processors 16, 54 may include any suitable device, such as a programmable circuit, integrated circuit, memory and I/O circuits, an application specific integrated circuit, microcontroller, complex programmable logic device, other programmable circuits, or the like. The processors 16, 54 may also include a non-transitory computer readable medium, such as random access memory (RAM), a read-only memory (ROM), an erasable programmable read-only memory (EPROM or Flash memory), or any other suitable medium. Instructions for performing the method described below may be stored in the non-transitory computer readable medium and executed by the processor. The processor 16 may be communicatively coupled to the computer readable medium 18 and communication interface 12 through a system bus, mother board, or using any other suitable structure known in the art. Similarly, the processor 54 may be communicatively coupled to the computer readable medium 56 and network interface 52 through a system bus, mother board, or using any other suitable structure known in the art.

Although only preferred embodiments are selected to illustrate the present disclosure, various changes and modifications are readily made by those skilled in the art without departing from the scope of the present disclosure defined by the appended claims. The description of the above embodiments is illustrative only, and is not intended to limit the present disclosure that is defined by the appended claims and their equivalents.

The preferred embodiments of the present disclosure are described above with reference to the drawings. The many features and advantages of the embodiments are apparent from the detailed specification and, thus, it is intended by the appended claims to cover all such features and advantages of the embodiments that fall within the true spirit and scope thereof. Further, since numerous modifications and changes will readily occur to those skilled in the art, it is not desired to limit the inventive embodiments to the exact construction and operation illustrated and described, and accordingly all suitable modifications and equivalents may be resorted to, falling within the scope thereof.

It should be understood that each of the parts of the present disclosure may be implemented by hardware, software, firmware, or a combination thereof. In the above embodiments, multiple steps or methods may be realized by software or firmware that is stored in the memory and executed by an appropriate instruction executing system. For example, if it is realized by hardware, it may be realized by any one of the following technologies known in the art or a combination thereof as in another embodiment: a discrete logic circuit having a logic gate circuit for realizing logic functions of data signals, application-specific integrated circuit having an appropriate combined logic gate circuit, a programmable gate array (PGA), and a field programmable gate array (FPGA), etc.

The description or blocks in the flowcharts or of any process or method in other manners may be understood as being indicative of comprising one or more modules, segments or parts for realizing the codes of executable instructions of the steps in specific logic functions or processes, and that the scope of the preferred embodiments of the present disclosure comprise other implementations, wherein the functions may be executed in manners different from those shown or discussed, including executing the functions according to the related functions in a substantially simultaneous manner or in a reverse order, which should be understood by those skilled in the art to which the present disclosure pertains.

The logic and/or steps shown in the flowcharts or described in other manners here may be, for example, understood as a sequencing list of executable instructions for realizing logic functions, which may be implemented in any computer readable medium, for use by an instruction executing system, device or apparatus (such as a system including a computer, a system including a processor, or other systems capable of extracting instructions from an instruction executing system, device or apparatus and executing the instructions), or for use in combination with the instruction executing system, device or apparatus. As used herein, "a computer readable medium" can be any device that can contain, store, communicate with, propagate or transmit programs for use by an instruction executing system, device or apparatus, or can be used with the instruction executing system, device or apparatus. A computer readable medium may be, for example, but not limited to, a magnetic, optical, electromagnetic, infrared or semiconductor system, device, apparatus, or a propagation medium. More particular examples (inexhaustive lists) of a computer readable medium may comprise the following: an electrical connecting portion (electronic device) having one or more wirings, a portable computer hardware box (magnetic device), a random access memory (RAM) (electronic device), a read-only memory (ROM) (electronic device), an erasable programmable read-only memory (EPROM or flash memory) (electronic device), an optical fiber (optical device), and a portable compact disk read-only memory (CD-ROM) (optical device). Furthermore, a computer readable medium may be paper or other appropriate media on which the programs may be printed, as the programs may be obtained electronically through scanning optically the paper or other appropriate media and then compiling, interpreting, or processing in other appropriate manners, as necessary, and then the programs are stored in the computer memory.

The above literal description and drawings show various features of the present disclosure. It should be understood that those skilled in the art may prepare appropriate computer codes to carry out each of the steps and processes as described above and shown in the drawings. It should be also understood that all the terminals, computers, servers, and networks may be any type, and the computer codes may be prepared according to the disclosure to carry out the present disclosure by using the apparatus.

Particular embodiments of the present disclosure have been disclosed herein. Those skilled in the art will readily recognize that the present disclosure is applicable in other environments. In practice, there exist many embodiments and implementations. The appended claims are by no means intended to limit the scope of the present disclosure to the above particular embodiments. Furthermore, any reference to "a device to . . . " is an explanation of device plus function for describing elements and claims, and it is not desired that any element using no reference to "a device to . . . " is understood as an element of device plus function, even though the wording of "device" is included in that claim.

Although a particular preferred embodiment or embodiments have been shown and the present disclosure has been described, it is obvious that equivalent modifications and variants are conceivable to those skilled in the art in reading and understanding the description and drawings. Especially for various functions executed by the above elements (portions, assemblies, apparatus, and compositions, etc.), except otherwise specified, it is desirable that the terms (including the reference to "device") describing these elements correspond to any element executing particular functions of these elements (i.e. functional equivalents), even though the element is different from that executing the function of an exemplary embodiment or embodiments illustrated in the present disclosure with respect to structure. Furthermore, although the a particular feature of the present disclosure is described with respect to only one or more of the illustrated embodiments, such a feature may be combined with one or more other features of other embodiments as desired and in consideration of advantageous aspects of any given or particular application.

The embodiments described in the present disclosure primarily concern a portable electronic device in the form of a mobile telephone (also referred to as "mobile phone"). However, as will be understood by one of ordinary skill in the art, this disclosure is not limited to the context of a mobile telephone and may relate to any type of appropriate electronic apparatus having a audio sensor.

The invention claimed is:

1. A mobile device configured to determine a local environment of the mobile device, the mobile device comprising:
   a device audio sensor configured to detect sound waves; and
   a processor configured to:
      determine a variation between the detected sound waves and a reference signal;
      determine the local environment of the mobile device based on the determined variation;
      detect if the local environment of the mobile device is a covered environment or an uncovered environment;
      determine that the mobile device is covered if the variation between the sound frequency profile outside the local environment and the device sound frequency profile is greater than a predetermined threshold variation; and
      modify a behavior of the mobile device based on the determined local environment; and
   a communication interface configured to receive a sound frequency profile outside the local environment, wherein:
      the device audio sensor is configured to output a device sound frequency profile representing sound from the local environment of the mobile device detected by the device audio sensor and the reference signal comprises the sound frequency profile outside the local environment.

2. A mobile device configured to determine a local environment of the mobile device, the mobile device comprising:
   a device audio sensor configured to detect sound waves;
   a processor configured to:
      determine a variation between the detected sound waves and a reference signal;

determine the local environment of the mobile device based on the determined variation;

detect if the local environment of the mobile device is a covered environment or an uncovered environment; and modify a behavior of the mobile device based on the determined local environment; and a communication interface configured to receive a sound frequency profile outside the local environment, wherein:

the device audio sensor is configured to output a device sound frequency profile representing sound from the local environment of the mobile device detected by the device audio sensor and the reference signal comprises the sound frequency profile outside the local environment;

the sound frequency profile outside the local environment represents sound detected by an environment audio sensor separate from and located at a distance from the mobile device and the environment audio sensor is communicatively coupled to the mobile device via the communication interface in order to communicate the sound frequency profile outside the local environment; and the processor is configured to determine the variation between the sound frequency profile outside the local environment and the device sound frequency profile based on a calculated damping profile representing a level of attenuation across a range of frequencies of the device sound frequency profile compared to the sound frequency profile outside the local environment.

3. A system comprising:
the mobile device of claim 2; and
the environment audio sensor separate from and located at the distance from the mobile device and the environment audio sensor is communicatively coupled to the mobile device via the communication interface in order to communicate the sound frequency profile outside the local environment, wherein the environment audio sensor is an audio sensor located separate from a user of the mobile device.

4. The mobile device of claim 2, wherein when the processor detects the mobile device to be in a covered environment, the processor is further configured to estimate at least one of a type of the material covering the mobile device, the density of the material covering the mobile device, or a thickness of the material covering the mobile device.

5. The mobile device of claim 2, wherein the processor is configured to determine the variation between the sound frequency profile outside the local environment and the device sound frequency profile by integrating over the mathematical difference between the device sound frequency profile and the sound frequency profile outside the local environment.

6. The mobile device of claim 2, wherein the calculated damping profile comprises a ratio of the sound frequency profile outside the local environment and the device sound frequency profile.

7. The mobile device of claim 2, wherein when the processor determines that the mobile device is covered, the processor is configured to compare the calculated damping profile to stored damping profiles for various materials to determine a stored damping profile that the calculated damping profile is most similar to.

8. The mobile device of claim 2, wherein when the processor determines that the mobile device is covered, the processor is configured to compare the calculated damping profile to stored damping profiles for various materials to determine a set of the stored damping profiles that the calculated damping profile is most similar to.

9. The mobile device of claim 8, wherein the processor is configured to determine the set of the stored damping profiles that the calculated damping profile is most similar to by determining the set of the stored damping profiles that minimizes the following equation:

$$F(DP_d) = \text{abs}(DP_a - \Sigma_{i=1}^{N} DP_i),$$

where abs is the absolute value, DPd is the determined set of stored damping profiles including N of the stored damping profiles where N is an integer greater than or equal to one, DPa is the calculated damping profile, and DPi is the ith calculated damping profile in the determined set of stored damping profiles.

10. The mobile device of claim 8, wherein the processor is configured to determine the set of the stored damping profiles that the calculated damping profile is most similar to by determining the set of the stored damping profiles that minimizes the following equation:

$$F(DP_d, M_i) = \text{abs}(DP_a - \Sigma\Sigma_{i=1}^{N} * DP_i)$$

where abs is the absolute value, * represents multiplication, DPd is the determined set of stored damping profiles including N of the stored damping profiles where N is an integer greater than or equal to one, M is a set of multiplicative factors applied to the determined set of stored damping profiles, DPa is the calculated damping profile, DPd,i is an ith damping profile in the determined set of stored damping profiles, and Mi is a ith multiplicative factor applied to the ith damping profile.

11. The mobile device of claim 2, wherein modifying the behavior of the mobile device includes at least one of:
changing a ringer volume of the mobile device;
setting a vibrating mode of the mobile device;
setting a behavior of a display of the mobile device;
setting a behavior of displaying notifications to a user of the mobile device;
turning off a display of the mobile device while the mobile device is determined to be covered;
increasing the ringer volume of the mobile device while the mobile device is determined to be in a bag;
turning off vibrate while the mobile device is determined to be in a bag; or
reducing the ringer volume of the mobile device while the mobile device is determined to be uncovered.

12. A system comprising:
an ultrasonic device configured to output an ultrasonic signal having a known properly:
a mobile device configured to determine a local environment of the mobile device, the mobile device comprising
a device audio sensor configured to:
output a device sound frequency profile representing sound from the local environment of the mobile device detected by the device audio sensor, and
detect the ultrasonic signal out by the ultrasonic device; and
a processor configured to:
determine a variation between the detected ultrasonic signal and the known property of the ultrasonic signal;

determine the local environment of the mobile device by determining a sound frequency profile outside the local environment, where the sound frequency profile outside the local environment is determined by:
- determining a sound attenuation profile based on the determined variation between the detected ultrasonic signal and the known property of the ultrasonic signal; and
- applying an inverse of the sound attenuation profile to the device sound frequency profile, wherein the sound attenuation profile represents an attenuation of frequencies of sound represented in the device sound frequency profile; and modify a behavior of the mobile device based on the determined local environment.

13. The system of claim 12, wherein the amplitude of the ultrasonic signal is the known property of the ultrasonic signal, the processor configured to:
determine the variation by dividing the amplitude of the detected ultrasonic signal by the amplitude of the ultrasonic signal;
determine the sound attenuation profile by multiplying the determined variation by a conversion factor.

14. The system of claim 13, wherein the conversion factor comprises at least one value representing a differential attenuation of the ultrasonic signal compared to attenuation of the frequencies of sound represented in the device sound frequency profile.

* * * * *